(12) United States Patent
Sakata et al.

(10) Patent No.: US 10,449,747 B2
(45) Date of Patent: Oct. 22, 2019

(54) FUEL SYSTEM COMPONENT

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Yoshihiro Sakata, Kiyosu (JP); Mayuki Toriumi, Kiyosu (JP); Hideyuki Tsuzuki, Kiyosu (JP); Noboru Hosoe, Kiyosu (JP); Shota Takase, Kiyosu (JP); Shinji Shimokawa, Seto (JP); Masahide Kobayashi, Toyota (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 252 days.

(21) Appl. No.: 15/614,897

(22) Filed: Jun. 6, 2017

(65) Prior Publication Data

US 2017/0355167 A1    Dec. 14, 2017

(30) Foreign Application Priority Data

Jun. 9, 2016    (JP) .................................. 2016-115092

(51) Int. Cl.
*B32B 1/08* (2006.01)
*B29C 65/02* (2006.01)
(Continued)

(52) U.S. Cl.
CPC ................ *B32B 1/08* (2013.01); *B29C 65/02* (2013.01); *B29C 66/112* (2013.01);
(Continued)

(58) Field of Classification Search
CPC ........... B32B 1/08; B32B 27/08; B29C 65/02; B29C 66/112; B29C 66/131;
(Continued)

(56) References Cited

U.S. PATENT DOCUMENTS 5,297,818 A * 3/1994 Klinger ............... F16L 37/0987
285/93
8,181,678 B2 * 5/2012 Ando .................. B60K 15/0403
220/86.3 X
(Continued)

FOREIGN PATENT DOCUMENTS

CN     1891442 A    1/2007
JP     2002-254938 A    9/2002
(Continued)

OTHER PUBLICATIONS

Office Action dated Mar. 1, 2019 issued in corresponding CN patent application No. 201710425207.7 (and English translation).
(Continued)

*Primary Examiner* — Greg Binda
(74) *Attorney, Agent, or Firm* — Posz Law Group, PLC

(57) ABSTRACT

A fuel system component used to supply a fuel to a fuel tank or used to discharge the fuel from the fuel tank comprises a first resin layer; and a second resin layer formed in a similar color to that of the first resin layer and configured to include a welding portion that is welded to the first resin layer and an exposed portion that is not adjacent to or in contact with the first resin layer. A belt-like portion is formed on a first resin layer-side and conically shaped surface of the exposed portion of the second resin layer at a distance from a boundary between the welding portion and the exposed portion and is configured to include at least one of a concavity and a convexity extended intermittently or continuously.

13 Claims, 9 Drawing Sheets

(51) Int. Cl.
  *B29C 65/00* (2006.01)
  *B32B 27/08* (2006.01)
  *B29C 45/14* (2006.01)
  *B29C 45/16* (2006.01)
  *B29L 31/00* (2006.01)

(52) U.S. Cl.
  CPC ...... *B29C 66/131* (2013.01); *B29C 66/53247* (2013.01); *B29C 66/71* (2013.01); *B29C 66/723* (2013.01); *B32B 27/08* (2013.01); *B29C 45/14311* (2013.01); *B29C 45/1671* (2013.01); *B29C 2045/14319* (2013.01); *B29L 2031/7172* (2013.01); *Y10S 285/919* (2013.01)

(58) Field of Classification Search
  CPC . B29C 66/53247; B29C 66/71; B29C 66/723; B29C 2045/14319; B29C 45/1671; B29C 45/14311; B29L 2031/7172
  USPC ............ 285/93, 290.1; 220/86.2, 86.3
  See application file for complete search history.

(56) References Cited

U.S. PATENT DOCUMENTS

| | | |
|---|---|---|
| 2002/0121517 A1 | 9/2002 | Aoki et al. |
| 2004/0056482 A1 | 3/2004 | Kurihara et al. |
| 2007/0000928 A1 | 1/2007 | Nishiyama et al. |
| 2014/0027451 A1* | 1/2014 | Kaneko ............... B60K 15/01 220/86.2 |

FOREIGN PATENT DOCUMENTS

| | | |
|---|---|---|
| JP | 2002-322955 A | 11/2002 |
| JP | 2005-125698 A | 5/2005 |
| JP | 2007-008352 A | 1/2007 |
| JP | 2009-132200 A | 6/2009 |

OTHER PUBLICATIONS

Office Action dated Apr. 24, 2018 issued in corresponding JP patent application No. 2016-115092 (and English translation).

* cited by examiner

SECOND EMBODIMENT

[WITH RUN-OVER]

THIRD EMBODIMENT

[WITH RUN-OVER]

FUEL SYSTEM COMPONENT

CROSS-REFERENCE TO RELATED APPLICATION

The present application claims priority from Japanese patent application 2016-115092 filed on Jun. 9, 2016, the entirety of the content of which is hereby incorporated by reference into this application.

BACKGROUND

Field

The disclosure relates to a fuel system component used either for supply of a fuel to a fuel tank or for discharge of the fuel from the fuel tank.

Related Art

A fuel system component configured by layering different resin materials may be employed as a fuel system component that is used, for example, to supply a fuel to a fuel tank mounted in a vehicle or discharge the fuel from the fuel tank. Example of such fuel system component include a component (welding joint for fuel tank) that is welded to the fuel tank and is configured to be connected with an inlet pipe for fueling and a component that is welded to the fuel tank and is configured to be connected with a fuel vapor discharge pipe arranged toward a canister. JP 2002-254938A discloses a welding joint for fuel tank provided in a tubular outer shape and is configured to include a barrier layer that is placed as an inner layer and is made of a polyamide or a polyacetal having high fuel permeation resistance and a joint main body that is placed as an outer layer and is made of a modified olefin resin by addition of a polar functional group having high weldability to the fuel tank. The layered structure of the plurality of different resin materials may be produced by two-color molding using the injection molding technique or the like.

In the fuel system component including a plurality of resin layers as described above, there may be a region (hereinafter referred to as "boundary") where a welding portion of two resin layers is continuous with an exposed portion where one of the two resin layers is exposed. In the process of manufacturing such a fuel system component, in the case of injection molding the other resin layer after formation of one resin layer, the other resin layer is likely to run over from an expected location. This may cause a region of the boundary that is originally expected to form the exposed portion, to be formed as the welding portion. According to a prior art technique, the presence or the absence of a run-over of the resin material is checked by observing the boundary between the welding portion and the exposed portion in a completed fuel system component. When the two resin layers have different colors, the presence or the absence of a run-over of the resin material is relatively readily recognizable by visual inspection. When the two resin layers have similar colors, for example, when the two resin layers are both black in color by inclusion of carbon black in the inner layer for the purpose of improving the fuel permeation resistance and inclusion of carbon black in the outer layer for the purpose of further improving the fuel permeation resistance, there is a difficulty in visually recognizing the presence or the absence of a run-over of the resin material. There is accordingly a demand for a technique that enables the boundary of two different resin layers to be readily recognized in the fuel system component including two different resin layers of similar colors.

SUMMARY

According to one aspect of the present disclosure, there is provided a fuel system component used to supply a fuel to a fuel tank or used to discharge the fuel from the fuel tank. This fuel system component comprises a first resin layer; and a second resin layer formed in a similar color to that of the first resin layer and configured to include a welding portion that is welded to the first resin layer and an exposed portion that is not adjacent to or in contact with the first resin layer. A first resin layer-side and conically shaped surface of the exposed portion of the second resin layer extends from a boundary between the welding portion and the exposed portion. A belt-like portion (or belt-portion) is formed on the conically shaped surface of the exposed portion at a distance from the boundary and is configured to include at least one of a concave (concavity) and a convex (convexity) extended intermittently or continuously.

DESCRIPTION OF EMBODIMENTS

A. First Embodiment

A1. General Configuration of Fuel Supply Device

Figure 1:
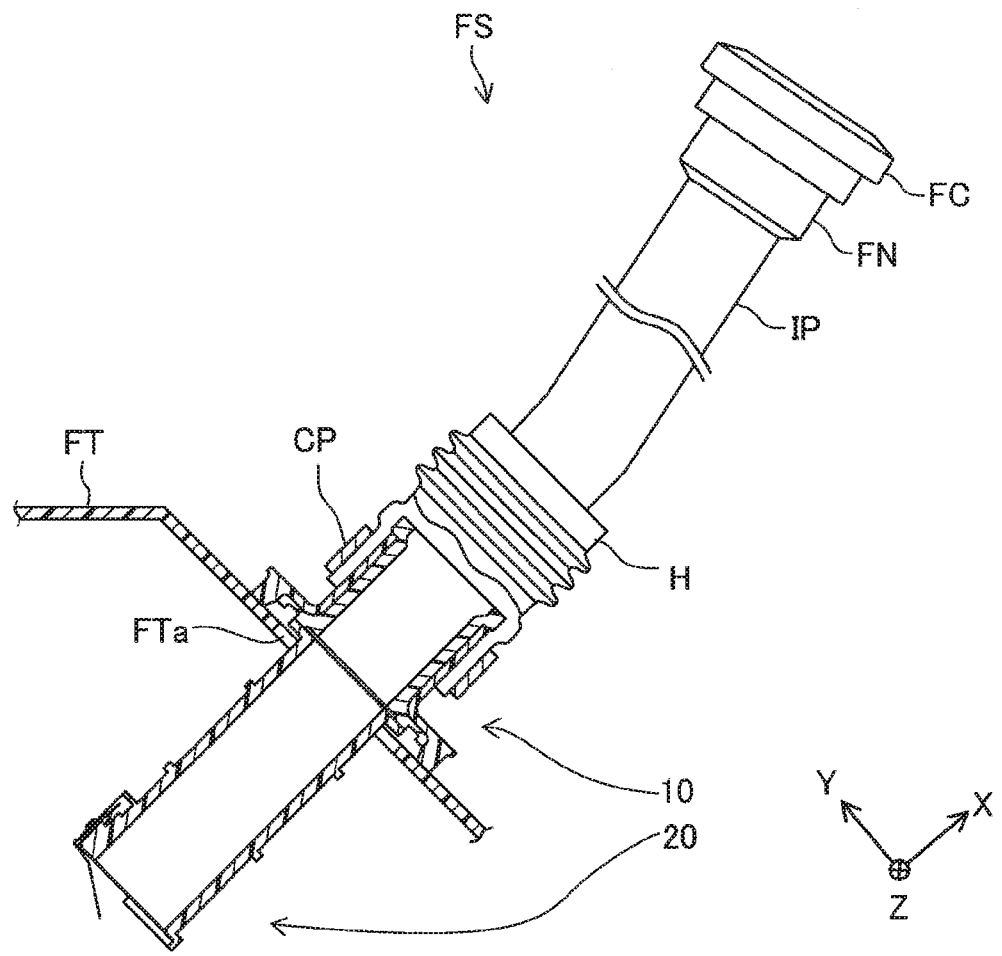
FIG. 1 is a schematic diagram illustrating a fuel supply device which a fuel tank piping connection device is applied to as one embodiment of the fuel system component of the present disclosure.

FIG. 1 is a schematic diagram illustrating a fuel supply device FS which a fuel tank piping connection device 10 is applied to as one embodiment of the fuel system component of the present disclosure. This fuel supply device FS is welded to a fuel tank FT and is configured to feed a fuel that is supplied from a fuel gun (not shown), to the fuel tank FT. According to this embodiment, the fuel tank FT is mounted on a vehicle. According to another embodiment, the fuel tank FT used may not be mounted on a vehicle.

The fuel supply device FS is configured to include a filler neck FN, an inlet pipe IP, an inlet hose H, the fuel tank piping connection device 10 and a check valve 20.

The filler neck FN has a fill port configured to be opened and closed by a fuel cap FC. The filler neck FN is connected with the fuel tank FT by a breather pipe (not shown). The inlet pipe IP is connected with one end of the filler neck FN such as to flow the fuel. According to this embodiment, the inlet pipe IP is made of a metal. According to another embodiment, the inlet pipe IP may be made of a resin instead of the metal. The inlet hose H is arranged to connect the inlet pipe IP with the fuel tank piping connection device 10 such as to flow the fuel. One end of the inlet hose H is connected with an opposite end of the inlet pipe IP that is opposite to an end connected with the filler neck FN. One end of the fuel tank piping connection device 10 is press fit in the other end of the inlet hose H, and the press fit region is fastened by means of a clamp CP. According to this embodiment, the inlet hose H is made of a rubber.

The fuel tank piping connection device 10 is configured to connect a fuel passage piping comprised of the filler neck FN, the inlet pipe IP and the inlet hose H with the fuel tank FT. An opposite end of the fuel tank piping connection device 10 that is opposite to the end press fit in the end of the inlet hose H is welded to the fuel tank FT and is also welded to the check valve 20.

The check valve 20 is configured to suppress the fuel in the fuel tank FT from flowing back to the fuel passage piping described above via the fuel tank piping connection device 10. One end of the check valve 20 is placed along an outer surface of the fuel tank FT and is welded with the fuel tank piping connection device 10. The remaining part of the check valve 20 other than the end welded with the fuel tank piping connection device 10 is placed inside of the fuel tank FT. The fuel tank piping connection device 10 and the check valve 20 are both formed in tubular outer shape and are arranged such that the respective axis lines are aligned. In the illustration of FIG. 1, an X axis is set to be parallel with these axis lines, and a Y axis and a Z axis are set to be perpendicular to the X axis and to be perpendicular to each other.

In the fuel supply device FS having the configuration described above, at the time of fueling, the fuel cap FC is detached, and fuel is injected from the fuel gun (not shown) to the filler neck FN. The fuel then flows through the inlet pipe IP, the inlet hose H and the fuel tank piping connection device 10 and further opens the check valve 20 to be fed into the fuel tank FT. At the stop of fueling, on the other hand, the check valve 20 is closed such as to prevent the fuel from being returned by the rising internal pressure of the fuel tank FT and flowing out.

A2. Configuration of Respective Components

A2-1. Configuration of Fuel Tank FT

The fuel tank FT is configured to include a plurality of resin layers including a barrier layer that is made of an ethylene vinyl alcohol copolymer (EVOH) and has excellent fuel permeation resistance and an outer layer that is made of polyethylene (PE). A tank opening FTa is formed on an upper part of a side wall of the fuel tank FT. The fuel tank piping connection device 10 is welded such as to surround this tank opening FTa.

A2-2. Configuration of Fuel Tank Piping Connection Device 10

Figure 2:
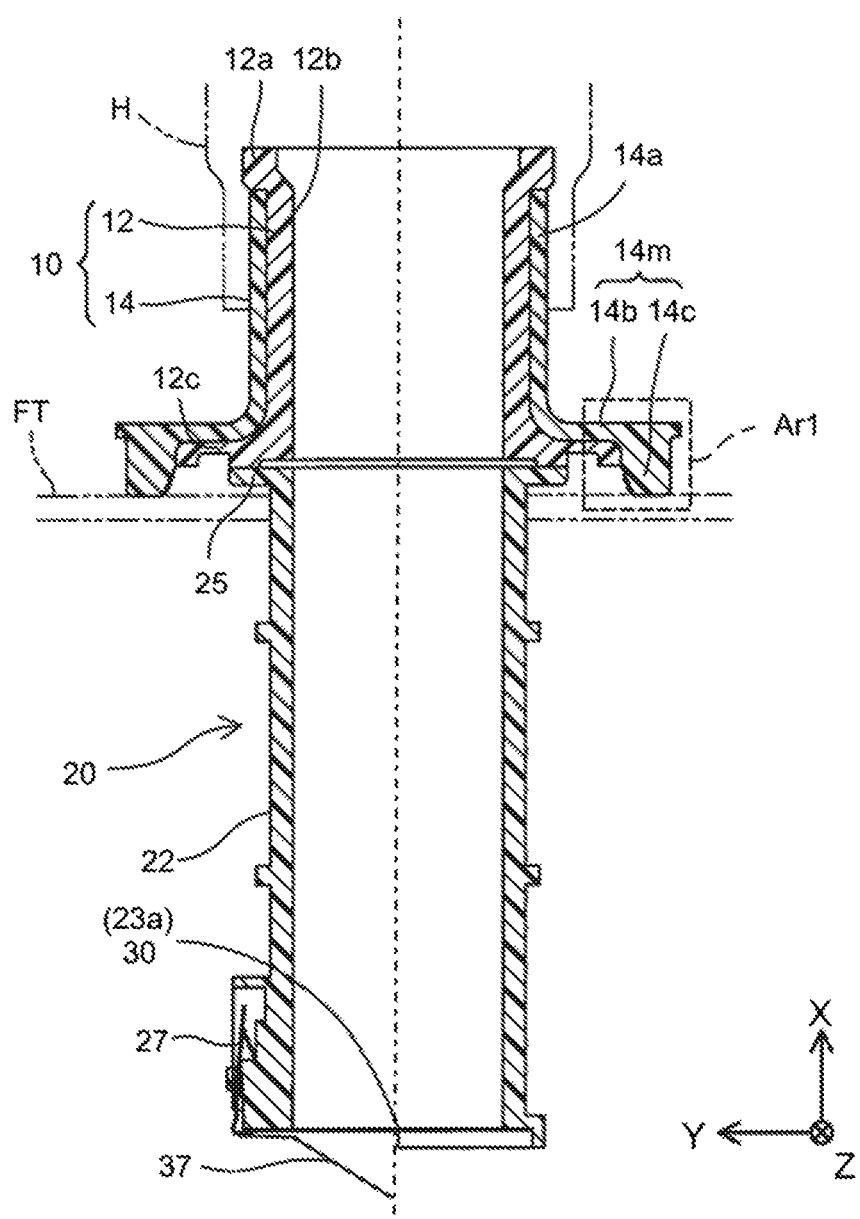
FIG. 2 is a sectional view illustrating closeup of the fuel tank piping connection device and a check valve.

FIG. 2 is a sectional view illustrating closeup of the fuel tank piping connection device 10 and the check valve 20. The fuel tank piping connection device 10 is configured to include a first resin layer 12 and a second resin layer 14 and has a cylindrical outer shape including a flange-shaped end that is welded to the fuel tank FT and the check valve 20. The first resin layer 12 and the second resin layer 14 are formed integrally by reaction bonding of two-color molding. The first resin layer 12 is placed inside of the second resin layer 14 and is configured to include a passage portion 12a that forms a passage connected with the inlet hose H. A retaining extended portion 12b is formed on one end of the passage portion 12a. The retaining extended portion 12b is extended outward in a radial direction from an outer circumferential end of the communication portion 12a, such as to suppress the inlet hose H from coming out of and being detached from the fuel tank piping connection device 10. A first cylinder portion 12c in a small-width cylindrical shape is formed on the other end of the passage portion 12a. An outer circumferential surface (inlet hose H-side surface) of the first cylinder portion 12c is welded to an inner circumferential surface of the second resin layer 14 (more specifically, a welding portion 14b described later). One end of the check valve 20 is welded to the other surface (check valve 20-side surface) of the first cylinder portion 12c. The first resin layer 12 is made of a resin material having good fuel permeation resistance, for example, a polyamide (PA) such as nylon-12.

The second resin layer 14 is placed outside of the first resin layer 12 and is configured to include an outer cylinder portion 14a and a second cylinder portion 14m. The outer cylinder portion 14a is placed to be adjacent to and in contact with an outer circumferential surface of the passage portion 12a. The second cylinder portion 14m is configured to include a flange-shaped welding portion 14b that is extended outward in the radial direction from an outer circumference of a check valve 20-side end of the outer cylinder portion 14a and an exposed portion 14c that is protruded in a ring shape on one end of the welding portion 14b. The welding portion 14b is welded with an outer circumferential surface of the first cylinder portion 12c of the first resin layer 12. The exposed portion 14c is, on the other hand, arranged not to be adjacent to or in contact with the outer circumferential surface of the first cylinder portion 12c but is exposed other than a region welded to the fuel tank FT. A check valve 20-side end face of the exposed portion 14c (end face 14e described later) is welded to the fuel tank FT. The second resin layer 14 is made of modified polyethylene that is thermally weldable to the fuel tank FT. The modified polyethylene is a resin material that is obtained by adding a polar functional group, for example, a maleic acid-modified functional group to polyethylene (PE) and is reaction-bonded with the polyamide (PA) by means of heat during injection molding. According to this embodiment, carbon black (CB) is contained in both the resin materials of the first resin layer 12 and the second resin layer 14, for the purpose of improving the fuel permeation resistance. Accordingly the first resin layer 12 and the second resin layer 14 have similar colors or more specifically are black in color.

Figure 3:
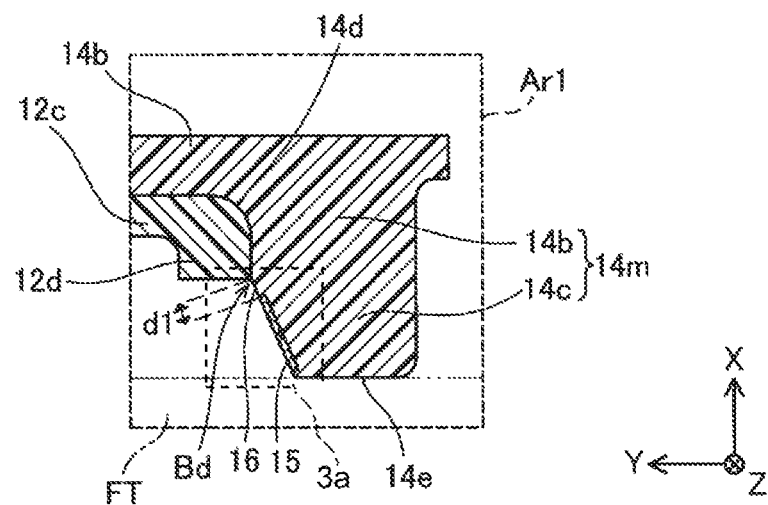
FIG. 3 is a sectional view illustrating closeup of a partial region shown in FIG. 2.

FIG. 3 is a sectional view illustrating closeup of a region Ar1 shown in FIG. 2. The region Ar1 is a region about a −Y-direction end of the second cylinder portion 14m. The Y-axis direction corresponds to the radial direction. More specifically, +Y direction corresponds to inward in the radial direction, and −Y direction corresponds to outward in the radial direction.

The first cylinder portion 12c includes a side face portion 12d formed at an end thereof to be bent in a direction (−X direction) perpendicular to the radial direction. A connecting region of this side face portion 12d with a radially extended portion of the first cylinder portion 12c is curved and formed in an R shape. The welding portion 14b corresponds to a portion of the second cylinder portion 14m having an inner circumferential surface that is welded with the first cylinder portion 12c. The exposed portion 14c corresponds to a portion of the second cylinder portion 14m having a conical-shaped surface with an inner circumferential surface that is not adjacent to or in contact with the first cylinder portion 12c. A boundary Bd between the welding portion 14b and the exposed portion 14c matches with a −X direction end of the side face portion 12d with regard to the position in the X-axis direction.

A belt-like portion 15 is formed around the entire circumference of an inner circumferential side surface of the exposed portion 14c, in other words, a first resin layer 12-side surface of the exposed portion 14c (hereinafter referred to as "exposed surface 16"). A +X direction end of the belt-like portion 15 is placed away from the boundary Bd by a distance d1. A −X direction end of the belt-like portion 15 is placed away from a boundary between the exposed surface 16 and the end face 14e by a predetermined distance. The belt-like portion 15 is configured to include fine concaves and fine convexes that are extended intermittently in a circumferential direction. In other words, the belt-like portion 15 is configured to include an embossed band-like surface that is continuous around the entire circumference. The belt-like portion 15 accordingly has rough surface of matte appearance as a whole with diffused reflection (irregular reflection) of irradiated light in various directions. The surface of the first cylinder portion 12c and the remaining part of the exposed surface 16 of the exposed portion 14c other than the belt-like portion 15, on the other hand, have higher smoothness (smaller surface roughness) compared with the belt-like portion 15 and include practically little visible concaves and convexes. The surface of the first cylinder portion 12c and the remaining part of the exposed surface 16 of the exposed portion 14c other than the belt-like portion 15 accordingly has glossy appearance as a whole with regular reflection (specular reflection) of irradiated light.

Figure 4:
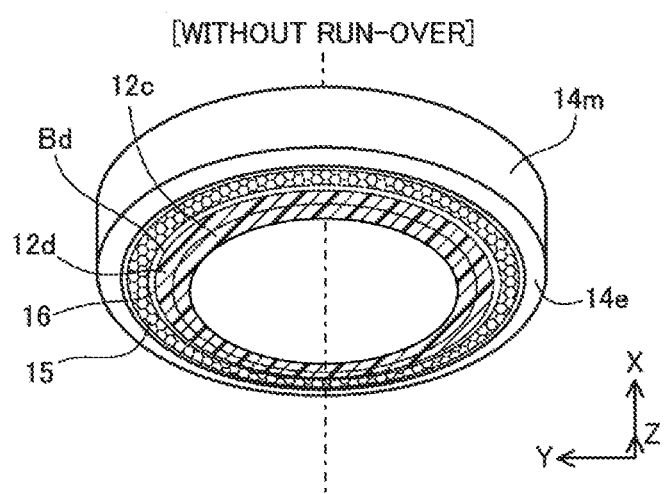
FIG. 4 is a perspective view illustrating a connecting end of the fuel tank piping connection device to be connected with the check valve.

FIG. 4 is a perspective view illustrating a connecting end of the fuel tank piping connection device 10 to be connected with the check valve 20. FIG. 4 illustrates an end of the fuel tank piping connection device 10 in the state that the fuel tank piping connection device 10 is not welded to the fuel tank FT or the check valve 20. More specifically, FIG. 4 illustrates the fuel tank piping connection device 10 without run-over of the resin material for the first resin layer 12 from an expected location in the course of manufacturing the fuel tank piping connection device 10 (i.e., in the course of two-color molding), i.e., the fuel tank piping connection device 10 of good quality. For the convenience of illustration, hatching of the second cylinder portion 14m is omitted. Part of a +X direction region of the fuel tank piping connection device 10, for example, the outer cylinder portion 14a, is also omitted for the convenience of illustration.

As described above and as shown in FIG. 3a, the belt-like portion 15 includes the fine concavities and the fine convexities that are extended intermittently around the entire circumference and has the surface of matte appearance. The first cylinder portion 12c, on the other hand, includes practically no concavities and convexities and has the surface of glossy appearance. This configuration enables the position of the boundary Bd to be readily recognized visually within the error of the distance d1.

Figure 5:
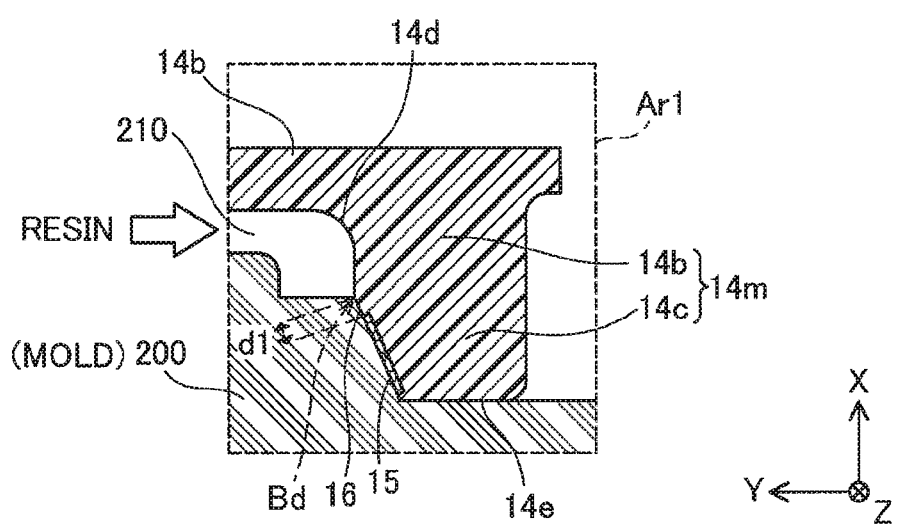
FIG. 5 is a sectional view schematically illustrating a process of manufacturing the fuel tank piping connection device.

FIG. 5 is a sectional view schematically illustrating a process of manufacturing the fuel tank piping connection device 10. FIG. 5 illustrates close-up of the same region Ar1 as that of FIG. 3. More specifically, FIG. 5 illustrates a process of manufacturing the first resin layer 12.

In the process of manufacturing the fuel tank piping connection device 10, the second resin layer 14 is molded first. More specifically, the resin material for the second resin layer 14 is injected into a mold of a predetermined shape having a cavity in the shape of the second resin layer 14 (hereinafter referred to as "mold for the second resin layer 14") to form the second resin layer 14. The mold for the second resin layer 14 used here has a portion corresponding to the belt-like portion 15 that is formed in a shape including fine concaves and fine convexes that are intermittently extended around the entire circumference. Accordingly the belt-like portion 15 is formed by injecting the resin material for the second resin layer 14. A method employable to form the shape including fine concaves and fine convexes that are intermittently extended around the entire circumference in the mold for the second resin layer 14 may, for example, mask a remaining portion of the mold for the second resin layer 14 other than the belt-like portion 15 and treat an exposed surface by dissolution processing with a solvent. This shape may be formed by mechanical processing, in place of dissolution processing.

After formation of the second resin layer 14, a mold of a predetermined shape 200 is placed to be adjacent to and in contact with the molded second resin layer 14 as shown in FIG. 5. This forms a cavity 210 in the shape of the first resin layer 12 (first cylinder portion 12c). The resin material for the first resin layer 12 is injected into this cavity 210 to form the first resin layer 12. The first resin layer 12 and the second resin layer 14 are welded to each other by reaction with heat.

The +X-direction end of the belt-like portion 15 is placed away from the boundary Bd by the distance d1. The belt-like portion 15 is accordingly not continuous from a position corresponding to the boundary Bd shown in FIG. 3 after completion of the fuel tank piping connection device 10, i.e., from a boundary position of the exposed surface 16 between the second resin layer 14 and an end of the mold 200. This configuration suppresses penetration of the resin material along the contact surface between the exposed surface 16 and the mold 200 from the boundary position of the exposed surface 16 between the second resin layer 14 and the end of the mold 200 in the process of injecting the resin material for the first resin layer 12 into the cavity 210. This is attributed to the following reason. The belt-like portion 15 has a large number of concaves and convexes, so that fine flow paths of the resin material are likely to be formed between the belt-like portion 15 and the mold 200 in the process of injecting the resin material. The arrangement of the belt-like portion 15 to be away from the boundary Bd by the distance d1, however, suppresses formation of such fine flow paths of the resin material and thereby suppresses penetration of the resin material. The resin material is, however, likely to penetrate along the contact surface between the exposed surface 16 and the mold 200 from the boundary position of the exposed surface 16 between the second resin layer 14 and the end of the mold 200, due to a manufacturing error (tolerance) of the second resin layer 14 and an error in layout position of the second resin layer 14 relative to the mold 200. In this case, the first resin layer 12 may be formed to be protruded from the expected location.

Figure 6:
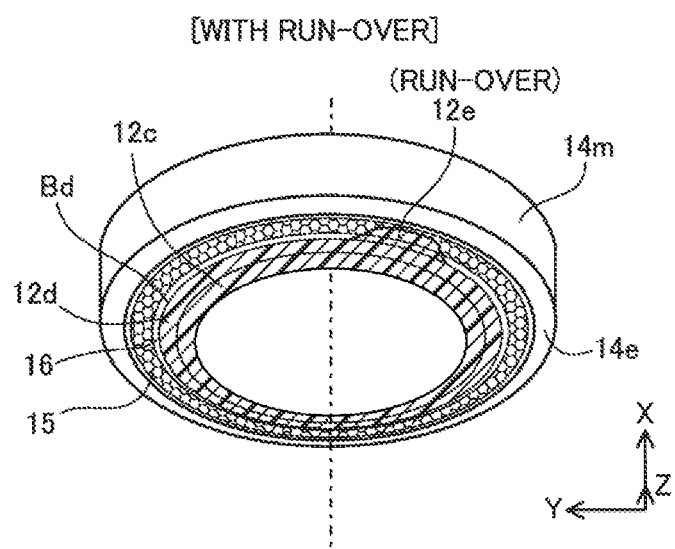
FIG. 6 is a perspective view illustrating the end of the fuel tank piping connection device with run-over of a resin material.

FIG. 6 is a perspective view illustrating the end of the fuel tank piping connection device 10 with run-over of the resin material. FIG. 6 illustrates the fuel tank piping connection device 10 viewed from the same position as that of FIG. 4. Like FIG. 4, part of a +X direction region of the fuel tank piping connection device 10 and hatching of the second cylinder portion 14m are omitted.

In the process of molding the first resin layer 12, when the resin material for the first resin layer 12 penetrates between the second resin layer 14 and the mold 200, the first resin layer 12 has a run-over 12e that is protruded from the expected location as shown in FIG. 6. An end of the run-over 12e reaches the belt-like portion 15, and part of the belt-like portion 15 is covered by the run-over 12e. The run-over 12e has a surface of glossy appearance with little concaves and convexes, whereas the belt-like portion 15 has matte appearance. This configuration enables the presence or the absence of the run-over 12, in other words, the boundary Bd between the welding portion 14b and the exposed portion 14c, to be readily recognized visually. The run-over 12e is made of a polyamide (PA) and is unlikely to be deformed (fused) even when heat is applied to weld the fuel tank piping connection device 10 to the fuel tank FT. The second cylinder portion 14m (the exposed portion 14c) is, on the other hand, deformed by heating. The non-deformed run-over 12e is likely to pierce into the deformed second cylinder portion 14m and thereby form a leakage pathway of the fuel from the fuel tank FT to the outside. It is accordingly desirable to discriminate the fuel tank piping connection device 10 with the run-over 12e as a defective product. Application of the present disclosure enables the presence or the absence of the run-over 12e to be recognized visually with high accuracy and thereby allows for discrimination between non-defective products and defective products with high accuracy.

A2-3. Configuration of Check Valve 20

As shown in FIG. 2, the check valve 20 is configured to include a passage forming member 22, a valve plate 30 and an opening position restricting member 37. The passage forming member 22 is in a tubular outer shape with one end 25 formed in a flange-like shape and is welded to a base region of the first cylinder portion 12c of the first resin layer 12. The passage forming member 22 is made of a polyamide (PA) like the first resin layer 12. The other end of the passage forming member 22 forms an outlet 23a. A mounting structure 27 is provided on an outer circumference on the end of the passage forming ember 22 where the outlet 23a is formed. The mounting structure 27 is configured to mount the valve plate 30 to the passage forming member 22. The valve plate 30 is mounted to one end of the passage forming member 22 and is configured to open and close the outlet 23a. The opening position restricting member 37 is mounted to one end of the passage forming member 22 like the valve plate 30 and is configured to restrict the opening position of the valve plate 30 to be less than a predetermined opening position.

Figure 7:
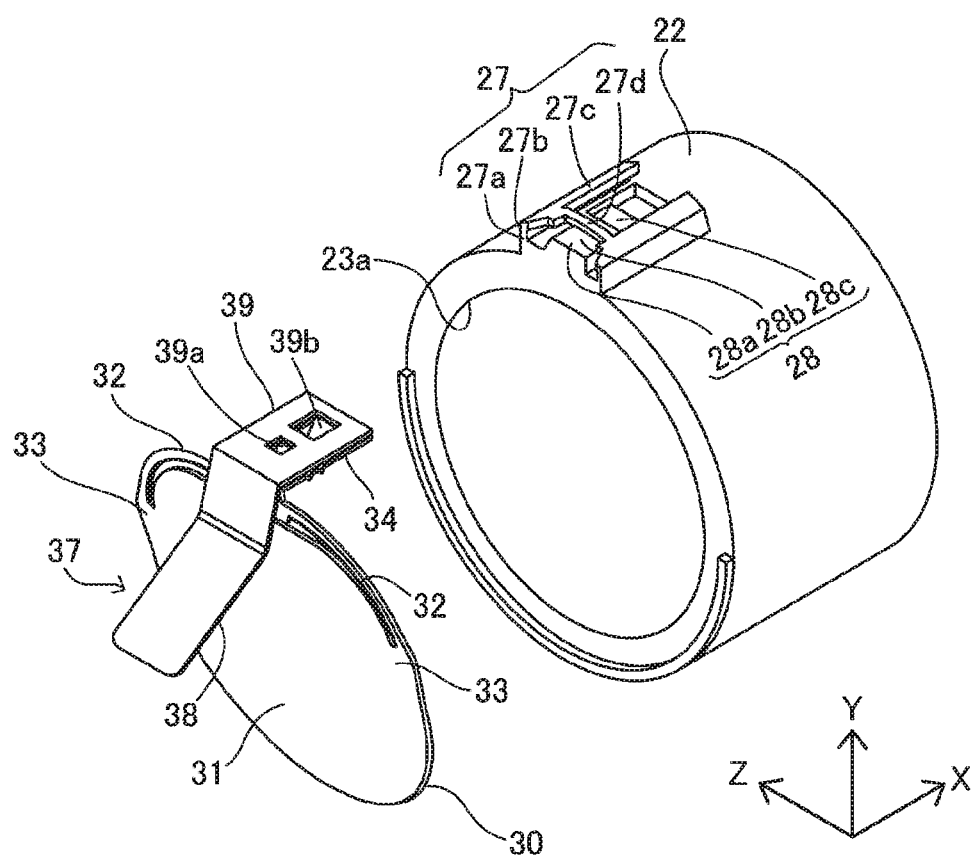
FIG. 7 is a perspective view illustrating the state that a valve plate is demounted from a passage forming member.

FIG. 7 is a perspective view illustrating the state that the valve plate 30 is demounted from the passage forming member 22. The mounting structure 27 of the passage forming member 22 includes a pair of side wall portions 27a that are arranged to rise from an outer circumferential edge of the passage forming member 22 to be approximately parallel to each other. The side wall portions 27a respectively include rising walls 27b and pressing elements 27c that are extended from the respective upper ends of the rising walls 27b to be opposed to each other. The rising wall 27b and the pressing element 27c are arranged to have an L-shaped sectional area. A bridge element 27d is provided over the respective pressing elements 27c of the pair of side wall portions 27a. A mounting groove 28 is formed between the pair of side wall portions 27, such that a mounted element 34 of the valve plate 30 and a mounted element 39 of a restriction element 38 described later are placed in the mounting groove 28. An inclined surface 28b is formed on a bottom of the mounting groove 28 to be inclined upward from an insertion opening 28a toward the depth. This configuration facilitates insertion of the two mounted elements 34 and 39. An engagement element 28c is provided to be recessed from one end of the inclined surface 28b.

The valve plate 30 is configured to include a closing element 31, a pair of arm elements 32, linkage elements 33 and a mounted element 34. The valve plate 30 is integrally formed as a flat spring by press-cutting and bending a metal thin plate.

The closing element 31 is configured to open and close the outlet 23a of the passage forming member 22. At the position where the closing element 31 closes the outlet 23a, the closing element 31 abuts with an end face of the passage forming member 22. The pair of arm elements 32 are formed to surround approximately semicircle of the outer circumference of the closing element 31. Respective one ends of the respective arm elements 32 are linked with the closing element 31 via the linkage elements 33. The respective other ends of the respective arm elements 32 are linked by the mounted element 34. The mounted element 34 is mounted to the mounting structure 27 of the passage forming member 22, such as to support the closing element 31 to be openable and closable. The mounted element 34 is bent relative to the closing element 31.

The opening position restricting member 37 is a thin plate member belt at two positions and is configured to include a restricting element 38 and a mounted element 39. When the closing element 31 is opened to increase the opening position of the outlet 23a to a predetermined position, the restricting element 38 comes into contact with the closing element 31, such as to restrict any further move of the closing element 31. The mounted element 39 is formed to be continuous with one end of the restricting element 38. The mounted element 39 has an identical shape and an identical size with those of the mounted element 34 of the valve plate 30 when being viewed in the −Y direction. These two mounted elements 34 and 39 are welded to each other. The mounted element 39 is configured to include an elastic piece 39a and a retainer 39b. The elastic piece 39a and the retainer 39b are formed by cutting and raising at about 45 degrees from the main body of the mounted element 39 (thin plate member), for example, by press-forming. The mounted element 34 includes through holes formed in the thickness direction at positions corresponding to the elastic piece 39a and the retainer 39b. When the valve plate 30 and the opening position restricting member 37 are mounted to the mounting structure 27, the retainer 39b is engaged with the engagement element 28c of the passage forming member 22, such as to suppress the mounted elements 34 and 39 from coming off and being detached from the mounting structure 27. The elastic piece 39a is compressed by the pressing elements 27c and the bottom of the mounting groove 28, such as to suppress backlash of the valve plate 30 in the radial direction.

When the mounted element 34 of the valve plate 30 and the mounted element 39 of the opening position restricting member 37 are to be mounted to the mounting structure 27 of the passage forming member 22, the respective mounted elements 34 and 39 are moved along the inclined surface 28b and inserted into the insertion opening 28a. In this state, the retainer 39b and the elastic piece 39a are compressed between the bridge element 27d and the bottom of the mounting groove 28. The retainer 39b reaches the engagement element 28c and is inserted into the engagement element 28b by the elastic force, so that the mounted elements 34 and 39 are fixed to the mounting structure 27.

Figure 3A:
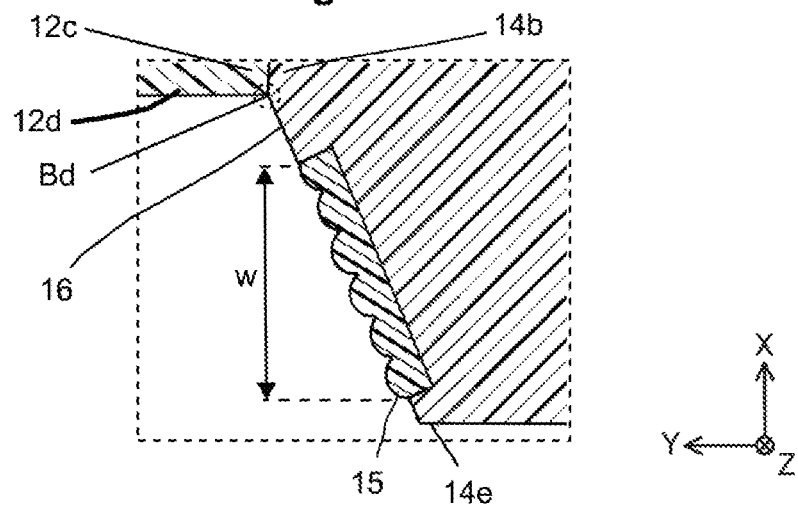
FIG. 3a is a sectional view illustrating closeup of a partial region shown in FIG. 3.

In the fuel tank piping connection device 10 of the first embodiment described above, the belt-like portion 15 including the concavities and convexities that are extended intermittently or continuously is formed in the exposed portion 14c of the second resin layer 14. The exposed portion 14c of the second resin layer 14 extends from the boundary Bd between the welding portion 14b and the exposed portion 14c. When the first resin layer 12 runs over to the belt-like portion 15 in the process of forming the first resin layer 12, at least one of the concavity and the convexity extend intermittently or continuously in the belt-like portion 15 is covered by the first resin layer 12 to be not visible. This configuration thus enables the boundary between the first resin layer 12 and the second resin layer 14 of the similar colors (black) to be readily recognized. The concavity and the convexity in the belt-like portion 15 are shown in FIG. 3a, which is a sectional view illustrating closeup of a partial region identified as 3a in FIG. 3.

The belt-like portion 15 is formed to be away from the boundary Bd by the distance d1. This configuration suppresses the resin material for the first resin layer 12 from penetrating along the contact interface between the exposed surface 16 and the mold 200 from the boundary position of the exposed surface 16 between the second resin layer 14 and the end of the mold 200 in the process of molding the first resin layer 12. This configuration accordingly suppresses run-over of the first resin layer 12 from the expected location.

The fuel tank piping connection device 10 is a component welded to the fuel tank FT. The configuration of the fuel tank piping connection device 10 enables a product including the first resin layer 12 having a run-over from the expected location to be discriminated as a defective product with high accuracy. This configuration accordingly suppresses the fuel tank piping connection device 10 that includes the first resin layer 12 having a run-over from the expected location and is likely to cause a fuel leakage from the fuel tank FT, from being welded to the fuel tank FT.

The fuel tank piping connection device 10 is used to connect the check valve 20 that is configured to suppress discharge of the fuel from the fuel tank FT, with the fuel passage piping (fuel supply pipe) comprised of the inlet hose H configured to supply the fuel to the fuel tank FT, the inlet pipe IP and the filler neck FN. This configuration suppresses a device likely to cause a fuel leakage from being used as the fuel tank piping connection device 10.

The belt-like portion 15 is formed in the exposed portion 14c to have the width "w" in the direction (X-axis direction) perpendicular to the radial direction of the second cylinder portion 14m and to include the concaves and the convexes extended intermittently around the entire circumference thereof, as shown in FIG. 3a. The belt-like portion 15 accordingly has the surface of matte appearance in a relatively wide region. This configuration enables the presence or the absence of a run-over of the first resin layer 12 to be identified with high accuracy even when the run-over is relatively small.

B. Second Embodiment

Figure 8:
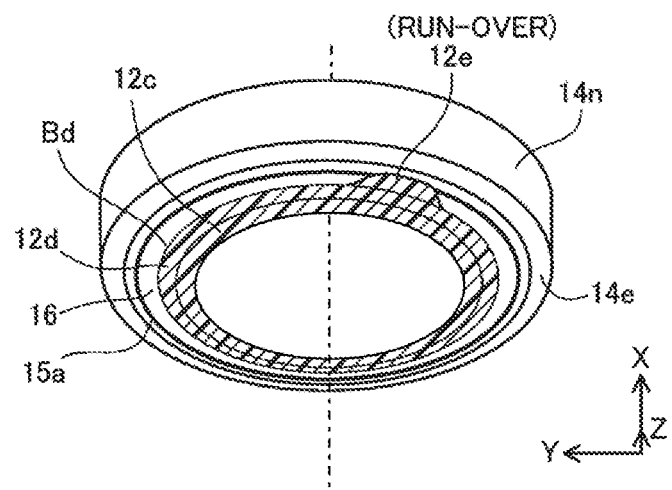
FIG. 8 is a perspective view illustrating an end of a fuel tank piping connection device with run-over of a resin material according to a second embodiment.

FIG. 8 is a perspective view illustrating an end of a fuel tank piping connection device with run-over of a resin material according to a second embodiment. The fuel tank piping connection device of the second embodiment differs from the fuel tank piping connection device 10 of the first embodiment by a second cylinder portion 14n provided in place of the second cylinder portion 14m. The other configuration of the fuel tank piping connection device of the second embodiment is similar to that of the fuel tank piping connection device 10 of the first embodiment. The like components are expressed by the like reference signs, and their detailed description is omitted. Like the fuel tank piping connection device 10 of the first embodiment, the fuel tank piping connection device of the second embodiment is welded to the check valve 20 and the fuel tank FT. FIG. 8 illustrates the fuel tank piping connection device of the second embodiment viewed from the same position as that of the first embodiment shown in FIG. 4. Like FIG. 4, part of a +X direction region of the fuel tank piping connection device and hatching of the second cylinder portion 14n are omitted.

The second cylinder portion 14n of the second embodiment differs from the second cylinder portion 14m of the first embodiment by a belt-like portion 15a provided in place of the belt-like portion 15. The other components of the second cylinder portion 14n of the second embodiment are similar to those of the second cylinder portion 14m of the first embodiment. The like components are expressed by the like reference signs, and their detailed description is omitted.

As shown in FIG. 8, the belt-like portion 15a of the second embodiment is configured by a recess (groove) that is formed continuously around the entire circumference of the exposed surface 16. This groove has different outgoing direction of the reflected light from that of the remaining part of the exposed surface 16 and the first cylinder portion 12c. When a run-over 12e occurs to cover part of the belt-like portion 15a as shown in FIG. 8, the presence of the run-over 12e is readily recognizable by a change in the outgoing direction of the reflected light in the covered part of the belt-like portion 15a. When an end of the run-over 12e is located in the belt-like portion 15a, at least the boundary Bd of the run-over 12e is readily recognizable. Additionally, the fuel tank piping connection device of the second embodiment provides similar advantageous effects to those of the fuel tank piping connection device 10 of the first embodiment.

C. Third Embodiment

Figure 9:
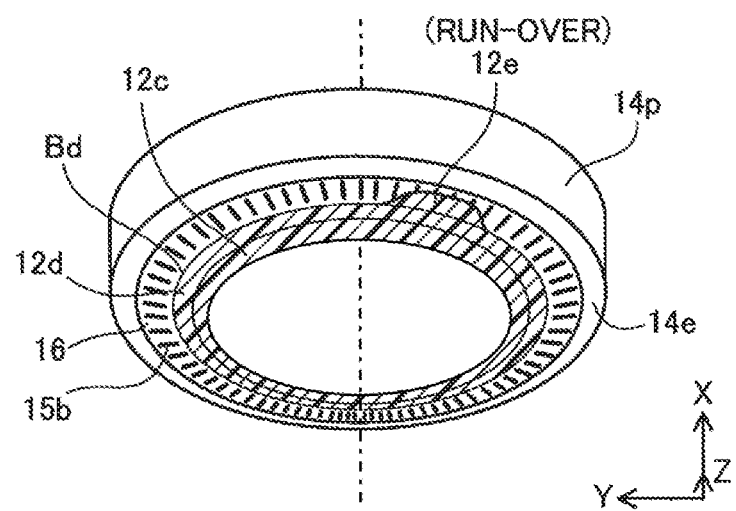
FIG. 9 is a perspective view illustrating an end of a fuel tank piping connection device with run-over of a resin material according to a third embodiment.

FIG. 9 is a perspective view illustrating an end of a fuel tank piping connection device with run-over of a resin material according to a third embodiment. The fuel tank piping connection device of the third embodiment differs from the fuel tank piping connection device 10 of the first embodiment by a second cylinder portion 14p provided in place of the second cylinder portion 14m. The other configuration of the fuel tank piping connection device of the third embodiment is similar to that of the fuel tank piping connection device 10 of the first embodiment. The like components are expressed by the like reference signs, and their detailed description is omitted. Like the fuel tank piping connection device 10 of the first embodiment, the fuel tank piping connection device of the third embodiment is welded to the check valve 20 and the fuel tank FT. FIG. 9 illustrates the fuel tank piping connection device of the third embodiment viewed from the same position as that of the first embodiment shown in FIG. 4. Like FIG. 4, part of a +X direction region of the fuel tank piping connection device and hatching of the second cylinder portion 14p are omitted.

The second cylinder portion 14p of the third embodiment differs from the second cylinder portion 14m of the first embodiment by a belt-like portion 15b provided in place of the belt-like portion 15. The other components of the second cylinder portion 14p of the third embodiment are similar to those of the second cylinder portion 14m of the first embodiment. The like components are expressed by the like reference signs, and their detailed description is omitted.

As shown in FIG. 9, the belt-like portion 15b of the third embodiment is configured to include a large number of short recesses (grooves) formed in the radial direction and arranged at predetermined intervals around the entire circumference of the exposed surface 16. Each of the grooves has different outgoing direction of the reflected light from that of the remaining part of the exposed surface 16 and the first cylinder portion 12c. When a run-over 12e occurs to cover part of the belt-like portion 15b as shown in FIG. 9, the presence of the run-over 12e is readily recognizable by a change in the outgoing direction of the reflected light in the covered part of the belt-like portion 15b. When an end of the run-over 12e is located in the belt-like portion 15b, at least the boundary Bd of the run-over 12e is readily recognizable. Additionally, the fuel tank piping connection device of the third embodiment provides similar advantageous effects to those of the fuel tank piping connection device 10 of the first embodiment.

D. Modifications

D1. Modification 1

In the respective embodiments described above, the belt-like portion 15, 15a or 15b is formed to be away from the boundary Bd by the distance d1. According to a modification, the belt-like portion may be formed to be continuous from the boundary Bd. This modified configuration enables the boundary Bd to be recognized with higher accuracy, irrespective of the presence or the absence of the run-over 12e. In the respective embodiments described above, the belt-like portion 15, 15a or 15b is also placed to be away from the boundary between the exposed surface 16 and the end face 14e by a predetermined distance. According to a modification, the belt-like portion may be formed to be continuous from this boundary.

D2. Modification 2

In the respective embodiments described above, the second resin layer 14 is welded to the fuel tank FT. According to a modification, the second resin layer 14 may not be welded to the fuel tank FT. For example, a screw mechanism may be provided in advance on the fuel tank FT, and a mating screw mechanism may be provided in the second resin layer 14 (exposed portion 14c) to be screwed to the screw mechanism of the fuel tank FT.

D3. Modification 3

The respective embodiments describe the application of the present disclosure to the fuel tank piping connection device 10. The present disclosure may also be applied to another fuel system component. For example, the present disclosure may be applied to a fuel shutoff valve mounted to a connection pipe that is arranged to connect the fuel tank FT with a canister configured to adsorb and desorb the evaporative emission of the fuel (fuel vapor). Like the fuel tank piping connection device 10 of the respective embodiments, the fuel shutoff valve may be manufactured by two-color molding of two different resin materials and may be configured to include the belt-like portion 15, 15a or 15b in one of resin layers. This configuration provides similar advantageous effects to those described in the respective embodiments. In another example, the present disclosure may be applied to a check valve mounted to a breather pipe that is arranged to connect the fuel tank FT with a filler neck FN and welded to the fuel tank. In general, the present disclosure may be applied to any fuel system component used to supply the fuel to the fuel tank FT or used to discharge the fuel (fuel vapor) from the fuel tank FT.

D4. Modification 4

The belt-like portion 15a is configured by one recess (groove) as shown in FIG. 8 according to the second embodiment, but may be configured by a plurality of recesses (grooves), instead of one recess, according to a modification. The belt-like portion 15b is configured by a large number of short recesses (grooves) formed in the radial direction and arranged at predetermined intervals around the entire circumference as shown in FIG. 9 according to the third embodiment, but may be configured by multiple sets of such a large number of short recesses (grooves) arranged concentrically in the radial direction according to a modification. In this modification, the respective sets of the short recesses (grooves) may be formed in different diameters. According to another modification, the width of the belt-like portion 15 in the radial direction may be shortened, and a plurality of short belt-like portions may be arranged concentrically in the radial direction. In this modification, the respective belt-like portions may be formed in different diameters. The belt-like portion 15a is configured by the recess (groove) formed around the entire circumference according to the second embodiment, but may be configured by a convex (rib) instead of the recess (groove) according to a modification. The belt-like portion 15b is configured by a large number of short recesses (grooves) formed in the radial direction and arranged at predetermined intervals around the entire circumference of the exposed surface 16 according to the third embodiment, but may be configured by a large number of short convexes (ribs) arranged at predetermined intervals around the entire circumference, instead of the recesses (grooves). The belt-like portion 15a is configured by the recess formed continuously around the entire circumference according to the second embodiment, but may be configured by the recess formed intermittently around the entire circumference according to a modification. For example, recesses (grooves) of a predetermined length along the circumferential direction may be aligned at predetermined intervals. In general, the belt-like portion of the present disclosure may be a belt-like portion configured to include at least one of a concave and a convex extended intermittently or continuously.

D5. Modification 5

In the respective embodiments described above, both the first resin layer 12 and the second resin layer 14 are black in color. The present disclosure is, however, not restricted to this configuration. For example, one of the resin layers may be black in color, and the other of the resin layers may be dark gray in color. The resin layer may be chromatic, instead of achromatic like black or gray. For example, both the first resin layer 12 and the second resin layer 14 may be pink in color. In this case, one of the resin layers may be dark pink, and the other of the resin layers may be pale pink. Pink is only illustrative, and the resin layer may be any chromatic color. In general, the first resin layer 12 and the second resin layer 14 may have similar colors.

D6. Modification 6

In the respective embodiments described above, the fuel tank piping connection device 10 is configured to include the two resin layers. According to a modification, the fuel tank piping connection device 10 may be configured to include three or more resin layers. In this modification, when a welding portion and an exposed portion are formed to be continuous with each other in two adjacent resin layers, the configuration of forming the belt-like portion 15, 15a or 15b in the exposed portion provides similar advantageous effects to those described in the respective embodiments.

The present disclosure is not limited to any of the embodiments and the modifications described above but may be implemented by a diversity of other configurations without departing from the scope of the disclosure. For example, the technical features of any of the embodiments and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by any of the aspects described below.

According to one aspect of the present disclosure, there is provided a fuel system component used to supply a fuel to a fuel tank or used to discharge the fuel from the fuel tank. This fuel system component comprises a first resin layer; and a second resin layer formed in a similar color to that of the first resin layer and configured to include a welding portion that is welded to the first resin layer and an exposed portion that is not adjacent to or in contact with the first resin layer. A first resin layer-side surface of the exposed portion and extends from a boundary between the welding portion and the exposed portion. A belt-like portion is formed on the surface of the exposed portion and extends parallel to other parts of the surface (i.e. exposed surface 16) of the exposed portion not containing the belt-like portion when viewed from a cross-sectional such as FIG. 3. The belt-like portion is configured to include at least one of a concavity and a convexity.

In the fuel system component of this aspect, the belt-like portion is formed in the exposed portion of the second resin layer to be yeah to the boundary between the welding portion and the exposed portion and is configured to include at least one of the concavity and the convexity extend intermittently or continuously. When the first resin layer runs over to the belt-like portion in the process of forming the first resin layer, at least one of the concavity and the convexity extend intermittently or continuously in the belt-like portion is covered by the first resin layer to be not visible. This configuration thus enables the boundary between the first resin layer and the second resin layer of the similar colors to be readily recognized.

In the fuel system component of the above aspect, the belt-like portion may be formed on the first resin layer-side surface to be away from the boundary. In the fuel system component of this aspect, the belt-like portion is formed on the first resin layer-side surface of the exposed portion to be away from the boundary. In the case of injection molding the first resin layer, this configuration suppresses a resin material for the first resin layer from penetrating along a contact interface between the first resin layer-side surface and a mold for forming the second resin layer from a boundary position of the exposed portion between the first resin layer-side surface and an end of the mold. This configuration accordingly suppresses run-over of the first resin layer from an expected location.

In the fuel system component of the above aspect, the second resin layer may be welded to the fuel tank. This configuration enables a fuel system component that is likely to damage the second resin layer by the first resin layer running over from an expected location in the process of welding the second resin layer to the fuel tank, to be readily discriminated. This configuration accordingly suppresses a fuel in the fuel tank from being leaked out by the damage of the second resin layer.

The fuel system component of the above aspect may be used as a fuel tank piping connection device configured to connect a check valve provided to suppress discharge of the fuel from the fuel tank with a fuel supply pipe arranged to supply the fuel to the fuel tank. This configuration suppresses a device that is likely to cause a fuel leakage from being used as the fuel tank piping connection device.

In the fuel system component of the above aspect, the first resin layer may be configured to include a first cylinder portion in a cylindrical shape. The second resin layer may be configured to include a second cylinder portion in a cylindrical shape that is welded to an outer circumferential surface of the first cylinder portion. The welding portion may be configured to include a portion in an inner circumferential surface of the second cylinder portion that is welded to the outer circumferential surface of the first cylinder portion. The exposed portion may be configured to include a portion protruded in the perpendicular direction from an end of the portion in the inner circumferential surface of the second cylinder portion that is welded to the outer circumferential surface of the first cylinder portion. In the fuel system component of this aspect, the exposed portion includes the portion protruded in the direction perpendicular to the radial direction of the second cylindrical portion from the end of the portion in the inner circumferential surface of the second cylinder portion that is welded to the outer circumferential surface of the first cylinder portion. This protruded portion is used to connect the fuel tank with the fuel tank piping connection device.

In the fuel system component of the above aspect, the belt-like portion may be configured to have a width in the perpendicular direction and to include the concave and the convex formed intermittently around an entire circumference of the exposed portion. In the fuel system component of this aspect, the belt-like portion is configured to include the concave and the convex formed intermittently around the entire circumference of the exposed portion and to have the width in the perpendicular direction. The belt-like portion accordingly has the surface of matte appearance in a relatively wide region. This configuration enables the boundary between the first resin layer and the second resin layer to be identified with high accuracy and also enables the presence or the absence of a run-over of the first resin layer from an expected location to be identified with high accuracy even when the run-over is relatively small.

The present disclosure may be implemented by any of various aspects other than the aspects of the fuel system component described above, for example, a resin component included in the fuel system component, a welding joint for fuel tank, a fuel check valve, a fuel tank to which the welding joint for fuel tank or the fuel check valve is welded, and a manufacturing method of any of these components.

In an application of the present disclosure to a resin component included in the fuel system component, the present disclosure may be implemented by the following configuration.

According to another aspect, there is a resin component that is partially welded with another resin component in a similar color, such as to be included in a fuel system component used to supply a fuel to a fuel tank or used to discharge the fuel from the fuel tank. The resin component comprises an expected welding portion that is to be welded with the another resin component in the fuel system component; and an expected exposed portion that is not to be adjacent to or in contact with the another resin component in the fuel system component. A belt-like portion is formed on another resin component-side surface of the expected exposed portion in the fuel system component to be parallel to a virtual line corresponding to the exposed portion viewed from a cross section of the fuel system component, which extends a boundary between the resin component and the another resin component in the fuel system component. The belt-like portion is configured to include at least one of a concavity and a convexity extend intermittently or continuously.

What is claimed is:

1. A fuel system component used to supply a fuel to a fuel tank or used to discharge the fuel from the fuel tank, the fuel system component comprising:
a first resin layer formed in a first color; and
a second resin layer formed in a second color that is not readily recognizable by visual inspection as being a different color from the first color of the first resin layer and configured to include a welding portion that is welded to the first resin layer and an exposed portion that is not adjacent to or in contact with the first resin layer, wherein
a belt-like portion is formed on a first resin layer-side surface of the exposed portion of the second resin layer, the exposed portion of the second resin layer having a conical shape and extending from a boundary between the welding portion and the exposed portion, and
the belt-like portion is configured to include a surface with at least one of a concavity and a convexity extending intermittently or continuously.

2. The fuel system component according to claim 1, wherein
the second resin layer is welded to the fuel tank.

3. The fuel system component according to claim 1, wherein
the belt-like portion is formed on the exposed portion of the second resin layer having the conical shape at a distance from the boundary.

4. The fuel system component according to claim 3, wherein
the second resin layer is welded to the fuel tank.

5. The fuel system component according to claim 4,
the fuel system component being in a cylindrical outer shape, wherein
the belt-like portion is configured to have a width in an axial direction of the fuel system component including the at least one of the concavity and the convexity formed intermittently around an entire circumference of the exposed portion of the second resin layer.

6. The fuel system component according to claim 5,
the fuel system component being used as a fuel tank piping connection device configured to connect a check valve provided to suppress discharge of the fuel from the fuel tank with a fuel supply pipe arranged to supply the fuel to the fuel tank.

7. The fuel system component according to claim 6, wherein
the first resin layer is configured to include a first cylinder portion in a cylindrical shape,
the second resin layer is configured to include a second cylinder portion in a cylindrical shape that is welded to an outer circumferential surface of the first cylinder portion,
the welding portion is configured to include a portion in an inner circumferential surface of the second cylinder portion that is welded to the outer circumferential surface of the first cylinder portion, and
the exposed portion is configured to include a portion protruded in the perpendicular direction from an end of the portion in the inner circumferential surface of the second cylinder portion that is welded to the outer circumferential surface of the first cylinder portion.

8. The fuel system component according to claim 4,
the fuel system component being in a cylindrical outer shape, wherein
the belt-like portion is configured to include a groove formed continuously around an entire circumference of the exposed portion.

9. The fuel system component according to claim 8,
the fuel system component being used as a fuel tank piping connection device configured to connect a check valve provided to suppress discharge of the fuel from the fuel tank with a fuel supply pipe arranged to supply the fuel to the fuel tank.

10. The fuel system component according to claim 9, wherein
the first resin layer is configured to include a first cylinder portion in a cylindrical shape,
the second resin layer is configured to include a second cylinder portion in a cylindrical shape that is welded to an outer circumferential surface of the first cylinder portion,
the welding portion is configured to include a portion in an inner circumferential surface of the second cylinder portion that is welded to the outer circumferential surface of the first cylinder portion, and
the exposed portion is configured to include a portion protruded in the perpendicular direction from an end of the portion in the inner circumferential surface of the second cylinder portion that is welded to the outer circumferential surface of the first cylinder portion.

11. The fuel system component according to claim 4,
the fuel system component being in a cylindrical outer shape, wherein
the belt-like portion is configured to include a plurality of grooves that are formed along a radial direction of the fuel system component and are arranged at predetermined intervals around an entire circumference of the exposed portion.

12. The fuel system component according to claim 11,
the fuel system component being used as a fuel tank piping connection device configured to connect a check valve provided to suppress discharge of the fuel from the fuel tank with a fuel supply pipe arranged to supply the fuel to the fuel tank.

13. The fuel system component according to claim 12, wherein
the first resin layer is configured to include a first cylinder portion in a cylindrical shape,
the second resin layer is configured to include a second cylinder portion in a cylindrical shape that is welded to an outer circumferential surface of the first cylinder portion,
the welding portion is configured to include a portion in an inner circumferential surface of the second cylinder portion that is welded to the outer circumferential surface of the first cylinder portion, and
the exposed portion is configured to include a portion protruded in the perpendicular direction from an end of the portion in the inner circumferential surface of the second cylinder portion that is welded to the outer circumferential surface of the first cylinder portion.

* * * * *